(12) United States Patent
Nocon et al.

(10) Patent No.: US 11,100,713 B2
(45) Date of Patent: Aug. 24, 2021

(54) SYSTEM AND METHOD FOR ALIGNING VIRTUAL OBJECTS ON PERIPHERAL DEVICES IN LOW-COST AUGMENTED REALITY/VIRTUAL REALITY SLIP-IN SYSTEMS

(71) Applicant: Disney Enterprises, Inc., Burbank, CA (US)

(72) Inventors: Nathan D. Nocon, Valencia, CA (US); Amy E. Nelson, Los Angeles, CA (US); Michael P. Goslin, Sherman Oaks, CA (US); Seth A. Davis, Burbank, CA (US); Randall S. Davis, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/104,452

(22) Filed: Aug. 17, 2018

(65) Prior Publication Data
US 2020/0058168 A1  Feb. 20, 2020

(51) Int. Cl.
*G06T 19/00*  (2011.01)
*G06T 19/20*  (2011.01)
*G06F 3/01*  (2006.01)

(52) U.S. Cl.
CPC .......... *G06T 19/006* (2013.01); *G06F 3/012* (2013.01); *G06T 19/20* (2013.01); *G06T 2219/2004* (2013.01)

(58) Field of Classification Search
CPC ................... G06T 19/006; G06T 19/20; G06T 2219/2004; G06F 3/012
See application file for complete search history.

(56) References Cited

U.S. PATENT DOCUMENTS 6,786,877 B2  9/2004  Foxlin
7,672,781 B2  3/2010  Churchill et al.
(Continued)

FOREIGN PATENT DOCUMENTS

| KR | 20190098003 | * | 8/2019 |
| WO | 2016001909 A1 | | 1/2016 |
| WO | 2017151872 A1 | | 9/2017 |

OTHER PUBLICATIONS

Llorach, G. et al., "Position Estimation with a low-cost Inertial Measurement Unit", 2014 9th Iberian Conference on Information Systems and Technologies (CISTI), Barcelona, 2014, pp. 1-4. <http://ieeexplore.ieee.org/stamp/stamp.jsp?tp=&arnumber=6877049&isnumber=6876860>.

(Continued)

*Primary Examiner* — Phuc N Doan
(74) *Attorney, Agent, or Firm* — Patterson + Sheridan, LLP

(57) ABSTRACT

Techniques for aligning a virtual object with a physical object in an Augmented Reality (AR) or Virtual Reality (VR) application are described. An electronic peripheral includes a first inertial measurement unit ("IMU"). A head mounted display includes a second IMU. An estimated attitude for the electronic peripheral is generated using data from the first IMU. An estimated attitude for the head mounted display is generated using data from the second IMU. An orientation of a virtual object is determined based on the estimated first and second attitudes, such that the virtual object is aligned with an object in a user's physical environment when the virtual object is displayed to the user. The virtual object is displayed on the head mounted display.

15 Claims, 8 Drawing Sheets

(56) References Cited

U.S. PATENT DOCUMENTS

| | | | |
|---|---|---|---|
| 9,001,427 B2 | 4/2015 | Jacobs et al. | |
| 9,134,793 B2 | 9/2015 | McDonald et al. | |
| 9,459,692 B1 | 10/2016 | Li | |
| 9,524,580 B2 | 12/2016 | Katz et al. | |
| 9,551,873 B2 | 1/2017 | Zalewski | |
| 9,600,067 B2 | 3/2017 | Kumar et al. | |
| 9,640,120 B2 | 5/2017 | Petrov | |
| 9,678,102 B2 | 6/2017 | Ho et al. | |
| 9,794,691 B2 | 10/2017 | Werris | |
| 9,805,512 B1 | 10/2017 | Katz et al. | |
| 2008/0211768 A1 | 9/2008 | Breen et al. | |
| 2009/0147993 A1 | 6/2009 | Hoffmann et al. | |
| 2011/0190052 A1* | 8/2011 | Takeda | A63F 13/02 463/31 |
| 2013/0259244 A1 | 10/2013 | Christensen | |
| 2014/0364208 A1 | 12/2014 | Perry | |
| 2015/0348327 A1* | 12/2015 | Zalewski | G06F 3/01 345/419 |
| 2016/0025978 A1 | 1/2016 | Mallinson | |
| 2016/0124502 A1 | 5/2016 | Sawyer et al. | |
| 2016/0171771 A1* | 6/2016 | Pedrotti | G02B 27/017 345/633 |
| 2016/0216760 A1 | 7/2016 | Trutna et al. | |
| 2016/0228771 A1 | 8/2016 | Watson | |
| 2016/0335773 A1 | 11/2016 | Romano et al. | |
| 2016/0364904 A1 | 12/2016 | Parker et al. | |
| 2016/0378204 A1 | 12/2016 | Chen et al. | |
| 2017/0153866 A1 | 6/2017 | Grinberg et al. | |
| 2017/0168568 A1 | 6/2017 | Petrov | |
| 2017/0177082 A1* | 6/2017 | Michail | G06T 19/006 |
| 2017/0192232 A1 | 7/2017 | Katz et al. | |
| 2017/0336862 A1* | 11/2017 | Xu | G06F 3/038 |
| 2018/0108147 A1* | 4/2018 | Kim | G06T 15/20 |
| 2018/0150204 A1* | 5/2018 | Macgillivray | G06F 3/012 |

OTHER PUBLICATIONS

Le, Q. et al. "A Study on Remote Control System Integrated Intuitive Vision System for Field Robot Using Head Tracker system", 2014 14th International Conference on Control, Automation and Systems (ICCAS 2014), Seoul, 2014, pp. 326-330 <http://ieeexplore.ieee.org/stamp/stamp.jsp?tp=&arnumber=6988015&isnumber=6987542>.

LaValle, S. et al. "Head Tracking for the Oculus Rift", Jan. 1, 2014, 8 pages <http://msl.cs.illinois.edu/~lavalle/papers/LavYerKatAnt14.pdf>.

* cited by examiner

SYSTEM AND METHOD FOR ALIGNING VIRTUAL OBJECTS ON PERIPHERAL DEVICES IN LOW-COST AUGMENTED REALITY/VIRTUAL REALITY SLIP-IN SYSTEMS

BACKGROUND

Field of the Invention

The present disclosure generally relates to alignment of virtual objects in an augmented reality (AR) and/or virtual reality (VR) system.

Description of the Related Art

Computer graphics technology has significantly progressed since the first video games were developed. Relatively inexpensive 3D graphics engines now provide nearly photo-realistic interactive gameplay on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device which may be used to capture an image or a series of images of a physical, real-world scene. The captured images can then be displayed, for instance, on a display of the hand-held gaming device. Certain devices may be configured to insert virtual objects into the captured images before the images are displayed. Some devices may allow users to manipulate the virtual objects being displayed by, for example, moving the device or manipulating a joystick or buttons. This is commonly referred to as an augmented reality (AR) or virtual reality (VR) video game.

SUMMARY

Embodiments described herein include a system. The system includes an electronic peripheral for an Augmented Reality (AR) or Virtual Reality (VR) application, the peripheral including a first inertial measurement unit ("IMU"). The first IMU includes a first magnetometer, a first gyroscope, and a first accelerometer. The system further includes a head mounted display including a second IMU. The second IMU includes a second magnetometer, a second gyroscope, and a second accelerometer. The system further includes a processor and a memory storing a program, which, when executed on the processor, performs an operation. The operation includes receiving a first estimated attitude for the electronic peripheral, the first estimated attitude generated using data from the first IMU. The operation further includes receiving a second estimated attitude for the head mounted display, the second estimated attitude generated using data from the second IMU. The operation further includes determining an orientation of a virtual object for display on the head mounted display based on the estimated first and second attitudes, such that the virtual object is aligned with an object in a user's physical environment when the virtual object is displayed to the user. The operation further includes displaying the virtual object on the head mounted display.

Embodiments described herein further include a computer implemented method of aligning a virtual object with a physical object in an AR or VR application. The method includes receiving a first estimated attitude for an electronic peripheral for an AR or VR application. The electronic peripheral includes a first IMU. The first IMU includes a first magnetometer, a first gyroscope, and a first accelerometer. The first estimated attitude is generated using data from the first IMU. The method further includes receiving a second estimated attitude for a head mounted display, the head mounted display including a second IMU. The second IMU includes a second magnetometer, a second gyroscope, and a second accelerometer. The second estimated attitude is generated using data from the second IMU. The method further includes determining an orientation of a virtual object for display on the head mounted display based on the estimated first and second attitudes, such that the virtual object is aligned with an object in a user's physical environment when the virtual object is displayed to the user. The method further includes displaying the virtual object on the head mounted display.

Embodiments described herein further include a computer program product for aligning a virtual object with a physical object in an AR or VR application. The computer program product includes a computer-readable storage medium having computer-readable program code embodied therewith. The code, when executed by a processor, performs an operation. The operation includes receiving a first estimated attitude for an electronic peripheral for an AR or VR application. The electronic peripheral includes a first IMU, the first IMU including a first magnetometer, a first gyroscope, and a first accelerometer. The first estimated attitude is generated using data from the first IMU. The operation further includes receiving a second estimated attitude for a head mounted display, the head mounted display including a second IMU. The second IMU includes a second magnetometer, a second gyroscope, and a second accelerometer. The second estimated attitude is generated using data from the second IMU. The operation further includes determining an orientation of a virtual object for display on the head mounted display based on the estimated first and second attitudes, such that the virtual object is aligned with an object in a user's physical environment when the virtual object is displayed to the user. The operation further includes displaying the virtual object on the head mounted display.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
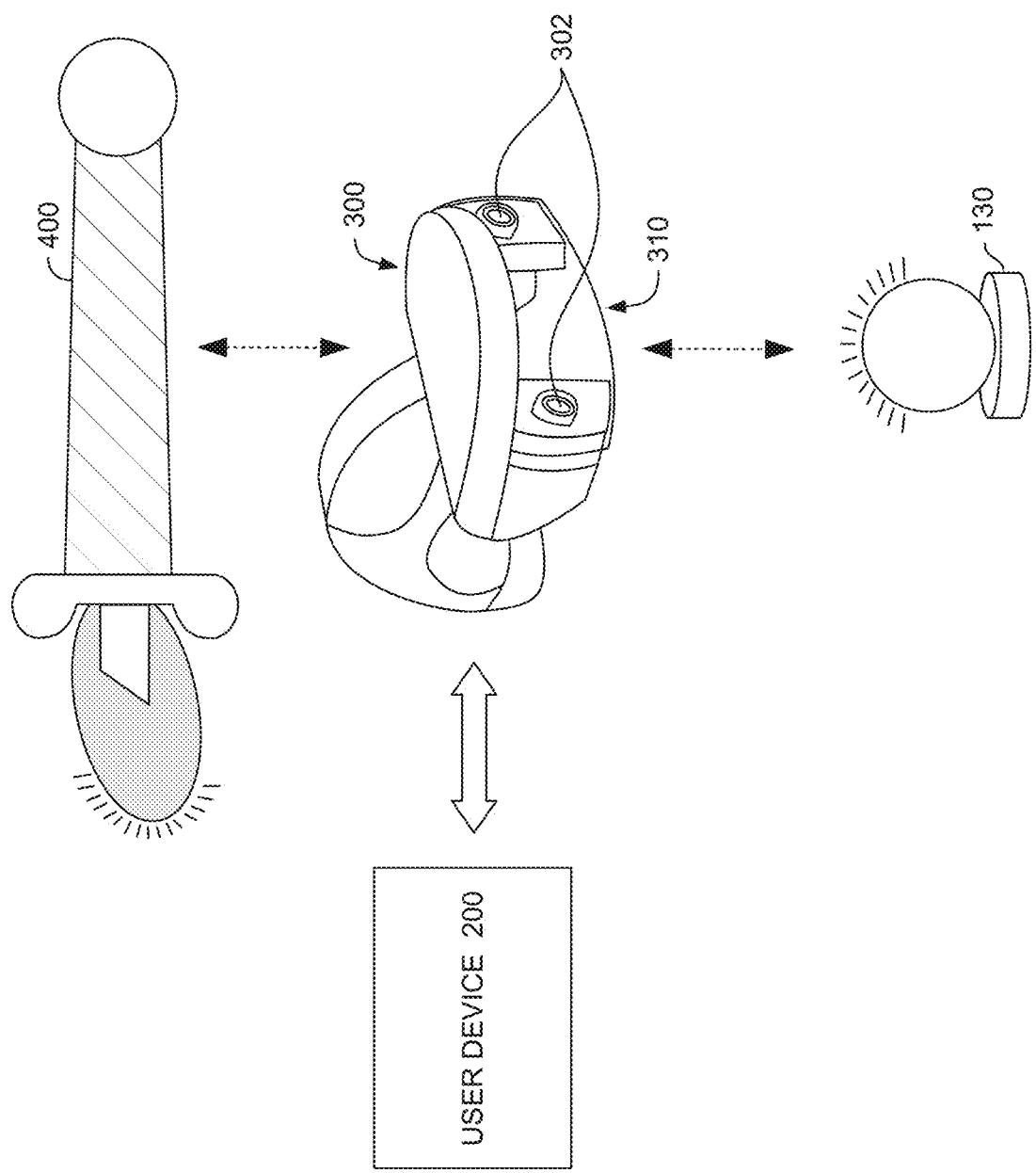
FIG. 1 is an illustration of an exemplary interactive environment, according to an embodiment.

Embodiments herein describe aligning virtual objects in an AR/VR application. As described above, AR/VR applications can involve the insertion of virtual objects into images of a physical, real world scene. The combination of virtual and real world objects can then be displayed to a user. And the user can manipulate the virtual objects through the use of a peripheral device.

One challenge in the display of virtual objects in an AR/VR application is to align the virtual object with an object in the physical world. For example, an AR/VR video game might include a physical hilt as a controller, to be held by the user, from which a virtual blade could project. As the user rotates the physical hilt, the AR/VR application should change the orientation of the virtual blade, so that the virtual blade appears to the user to extend out from the physical hilt.

To facilitate this alignment, one or more of the devices used with the AR/VR application can include an Inertial Measurement Unit ("IMU") with one or more sensors. The AR/VR application can use measurements from the IMU to determine the attitude of the physical hilt to relative to the user's head, and to render the virtual blade so that it is aligned with the physical hilt's yaw pitch and roll. In an embodiment the IMU can be a nine degree of freedom IMU and include an accelerometer, a gyroscope, and a magnetometer. In other embodiments, the IMU can include some, but not all, of these components, or additional suitable sensors. The components of the IMU are used to measure the position and orientation of the device containing the IMU, and the AR/VR application uses those measurements to align the virtual object in the physical world.

In an embodiment, the AR/VR application can be used with a head mounted display ("HMD"). This head mounted display can be a slip-in device, such that the user can slip his or her mobile device (e.g., a smartphone) into the head mounted display. Most mobile devices include an IMU, and so in this embodiment the IMU in the mobile device can be used to estimate the attitude of the head mounted display (i.e., the direction in which the user has pointed his or her head).

But in practice, the IMU built into the mobile device may not be reliable. The AR/VR application does not have full control over this IMU, so the mobile device may not prioritize measurements using its built in IMU. This hurts the accuracy of the attitude estimate for the head mounted display and results in mis-aligned virtual objects. Further, the IMU in the mobile device may be calibrated incorrectly, may be malfunctioning, or may include poor quality components. Instead, the head mounted display itself can include an IMU (accelerometer, gyro, and magnetomer), and that IMU can be used to estimate the attitude of the head mounted display. This can be combined with an estimate of the attitude of the physical peripheral device, from an IMU located in the peripheral, and the estimates can be used to align the virtual object with the physical object in the AR/VR application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In embodiments herein, a user may access applications (e.g., AR/VR application 240) or related data available in the cloud. For example, the AR/VR application could execute on a computing system in the cloud and control the AR/VR experience for the user. In such a case, the AR/VR application could store information related to use of the AR/VR application at a storage location in the cloud. Doing so allows a user to access this information from any computing system attached to a network connected to the cloud (e.g., the Internet).

FIG. 1 is an illustration of an exemplary interactive environment, according to an embodiment. In the example embodiment illustrated in FIG. 1, the interactive environment is an AR/VR video game, but embodiments herein can be used with any suitable AR/VR application. Within a system 100, a head mounted display 300 communicates with a user device 200. This communication can be done wirelessly, through Bluetooth® communications or any other suitable method. Further, the head mounted display 300 can be connected to the user device 200 directly, or through a wired connection. For example, the head mounted display 300 can be connected to the user device 200 through a USB interface. In an embodiment, data can be transmitted between the head mounted display 300 and the user device 200 on a periodic basis (e.g. 60 Hz).

The head mounted display 300 can be a headset to be worn by the user, or may be any device including a visual display of any suitable type. For example, the head mounted display 300 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The head mounted display may include a partially, or fully, transparent window through which a user may view the physical world. The head mounted display 300 is discussed further with regard to FIG. 3, below.

In some embodiments, the head mounted display 300 is separate from the user device 200 but is configured to superimpose virtual imagery onto physical objects in the user's field of view. For example, as illustrated in FIG. 1 the head mounted display 300 may be a body-worn device. The head mounted display 300 further includes a holder 310 for a user device 200. For example, the user device 200 can be a portable device like a smartphone or tablet. The user device 200 can be inserted into the holder 310 in the head mounted display 300 during gameplay. The user device 200 is described in more detail with respect to FIG. 2.

The head mounted display 300 may also be configured as an eyepiece or lens worn in front of the user's eye. In another example, the head mounted display 300 may be integrated into other devices that are carried or handled by the user, or having any other suitable user interaction during the game playing experience. For example, while participating in game play, the user may carry a toy blaster that includes an optical sight for aiming, and the head mounted display 300 may be integrated in the optical sight.

In some embodiments, the user device 200 operates in an AR mode, generally configured to superimpose virtual images such as characters, objects, and/or dynamic visual effects into the user's natural field of view of the environment using a head mounted display 300. The field of view of the user is generally determined using sensor devices such as the visual sensors 302. In some embodiments, the user device 200 is configured to operate in a VR mode, generally replacing the user's natural field of view of the environment with virtual imagery using the head mounted display 300.

For example, the head mounted display 300 may superimpose a virtual character to appear seated on a physical chair detected within the environment. The display of the virtual character on the head mounted display 300 is dynamically adjusted based on the user's field of view (orientation), the determined depth of the chair from the user, and so forth. As another example, the head mounted display 300 could superimpose a virtual blade extending from the peripheral device 400 (e.g., a sword hilt) held in the user's hand. In one embodiment, the virtual image can be generated by the user device 200 and displayed as a reflected image on the head mounted display 300. The head mounted display 300 can include optical elements like mirrors, beam splitters, and the like to facilitate display of the reflected image. The head mounted display 300 can also include lenses or other optical elements.

In some embodiments, the user device 200 is configured to dynamically select one of the AR mode and VR mode based on the sensed characteristics of the environment and/or based on the game play. For example, the visual sensors 302 may detect that the environment is extremely bright (e.g., when the user is in direct sunlight), which may be difficult for a user to view overlaid information using the head mounted display 300. In another example, the gameplay may specify a night-time setting. In these examples, the VR mode may be enabled in order to substantially isolate the user's field of view from the surrounding physical environment and thereby reduce the amount of light received from the environment. In both cases, dynamic selection of the AR/VR display mode can improve the immersive nature of the gameplay environment, whether through ensuring the user is able to suitably view the overlaid information or through providing a more realistic setting consistent with the virtual setting of the game.

The head mounted display 300 provides a compact AR/VR display that may be carried or worn by the user during the gameplay experience. As discussed above, the head mounted display 300 may include devices that are separate from the display of the user device 200. Implementations of the compact AR/VR display that use a smartphone or other mobile computing device offer several advantages. For example, implementations able to adapt the user's smartphone provide a reduced manufacturing cost of the compact AR/VR display, as no separate computing hardware need be included. A camera included in the smartphone may be used as visual sensor 302 to dynamically provide information regarding the physical environment and the user's field of view. Using a smartphone may also provide increased convenience to the user, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the user's eyes. Depending on the currently selected mode (AR or VR), the optical arrangement is further configured to transmit some or all of the light from the physical environment to the user's eyes. It may be beneficial to design a compact AR/VR display to have a relatively small size and weight. Smaller and lighter body-worn implementations allow for use by younger users or other users with reduced size and/or strength, and are generally less fatiguing during use. The positioning of the mobile computing device and/or the optical arrangement can also be selected to reduce a moment on the user. For example, in a head-worn compact AR/VR display, including a smartphone in a position closer to the user's head provides a smaller moment (e.g., corresponding to strain on the neck or upper body) than an implementation in which the smartphone is positioned further from the user's head. A compact (small-sized) implementation also reduces manufacturing costs through reduced material and process requirements. A compact implementation may also be more aesthetically pleasing for users, when compared with a large or bulky implementation.

The system 100 further includes a tracking beacon 130. The tracking beacon 130 includes a light that can be used as a reference point by the user device 200 and/or the head mounted display 300. The visual sensors 302 in the head mounted display 300 can be used to track the light from the tracking beacon 130 in order to provide a reference point for the floor in the user's physical location. Further, the tracking beacon 130 can be in communication with the user device 200 and/or the head mounted display 300 through a suitable wireless or wired communication protocol.

The system 100 further includes the peripheral device 400. In the AR/VR video game illustrated in FIG. 1, the peripheral device 400 acts as a game controller, simulating a sword or staff to the user. The peripheral device 400 can be in communication with a user device 200, a head mounted display 300, and/or a tracking beacon 130. This communication can be done wirelessly through Bluetooth communications, via a wired connection, or through any other suitable method. The peripheral device 400 is discussed further with regard to FIG. 4.

Figure 2:
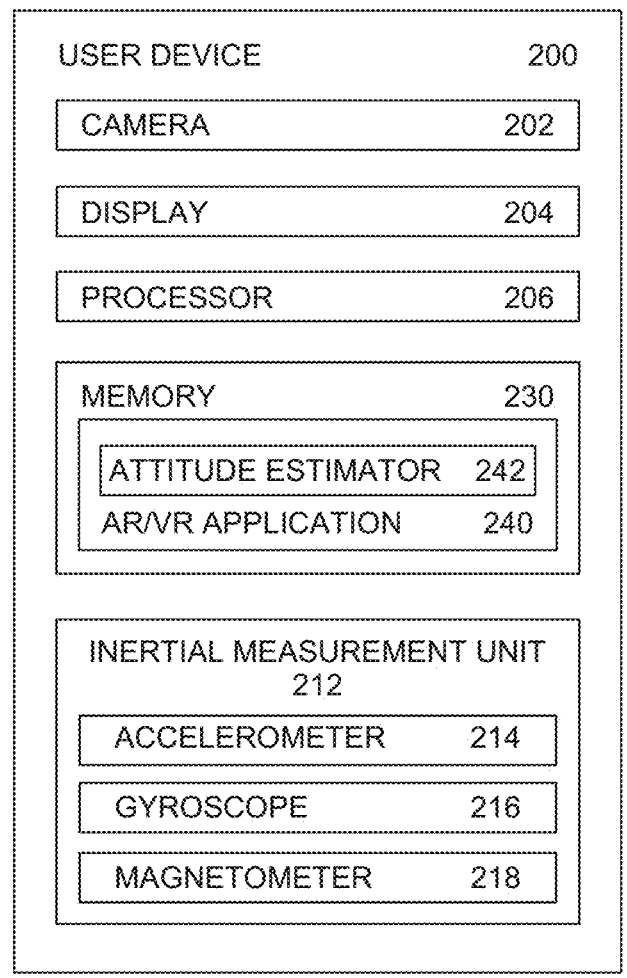
FIG. 2 is an illustration of a user device for use in an exemplary interactive environment, according to an embodiment.

FIG. 2 illustrates an exemplary user device 200, according to one embodiment. The user device 200 can be a smartphone, tablet, or any other suitable device. The user device 200 can be separate from the head mounted display 300, or the user device 200 and the head mounted display 300 can be integrated together to form a combined device. The user device 200 includes a camera 202. The camera 202 can be configured to sense visible light and/or infrared light. Alternatively, the camera 202 can be any other form of suitable visual sensor. The user device 200 further includes a display 204. The display 204 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

The user device 200 further includes a processor 206 which generally retrieves and executes programming instructions stored in the memory 230. The processor 206 is included to be representative of a single central processing unit (CPU), multiple CPUs, a single CPU having multiple processing cores, graphics processing units (GPUs) having multiple execution paths, and the like. The memory 230 is generally included to be representative of electronic storage of any suitable type(s), including random access memory or non-volatile storage.

The memory 230 generally includes program code for performing various functions related to game play. The program code is generally described as various functional "applications" or "modules" within the memory 230, although alternate implementations may have different functions and/or combinations of functions. Within the memory 230, the AR/VR application 240 is generally configured to control the AR/VR application for the user. The AR/VR application 240 can, for example, be an AR/VR video game, or any other suitable AR/VR application.

The AR/VR application 240 includes the Attitude Estimator module 242 which estimates the attitude of the peripheral device 400, the head mounted display 300, the user device 200, or any other suitable peripheral device in the system. This estimate is based on measurements from one or more of the IMUs 412 (in the peripheral device 400), 212 (in the user device 200), and 312 (in the head mounted display 300). As illustrated in FIG. 2, the AR/VR application 240 and the attitude estimator module 242 are contained within the memory 230 of the user device 200. Alternatively, the AR/VR application 240 and the attitude estimator module 242 can be contained in memory within the peripheral device 400, the head mounted display 300, or any other suitable location. Further, the attitude estimator module 242 can be contained within the AR/VR application 240, or can be located separately.

The user device 200 includes an IMU 212. As illustrated in FIG. 2, the IMU 212 is separate from the IMU 412 included in the peripheral device 400. For example, the IMU 212 could be part of a smartphone, tablet, or other suitable device. The IMU 212 includes sensors to measure the position and orientation of the user device 200. For example, the IMU 212 can include an accelerometer 214 which measures acceleration forces stemming from movement of the user device 200 in the user's physical environment. The IMU 212 can further include a gyroscope 216 that measures orientation of the user device 200 in the user's physical environment. The IMU 212 can further include the magnetometer 218 which measures properties of a magnetic field in the user's physical environment. The accelerometer 214, gyroscope 216, and magnetometer 218 are merely examples of sensors that can be included within the IMU 212. In an embodiment, the IMU 212 can include additional suitable sensors, or can include fewer sensors.

Figure 3:
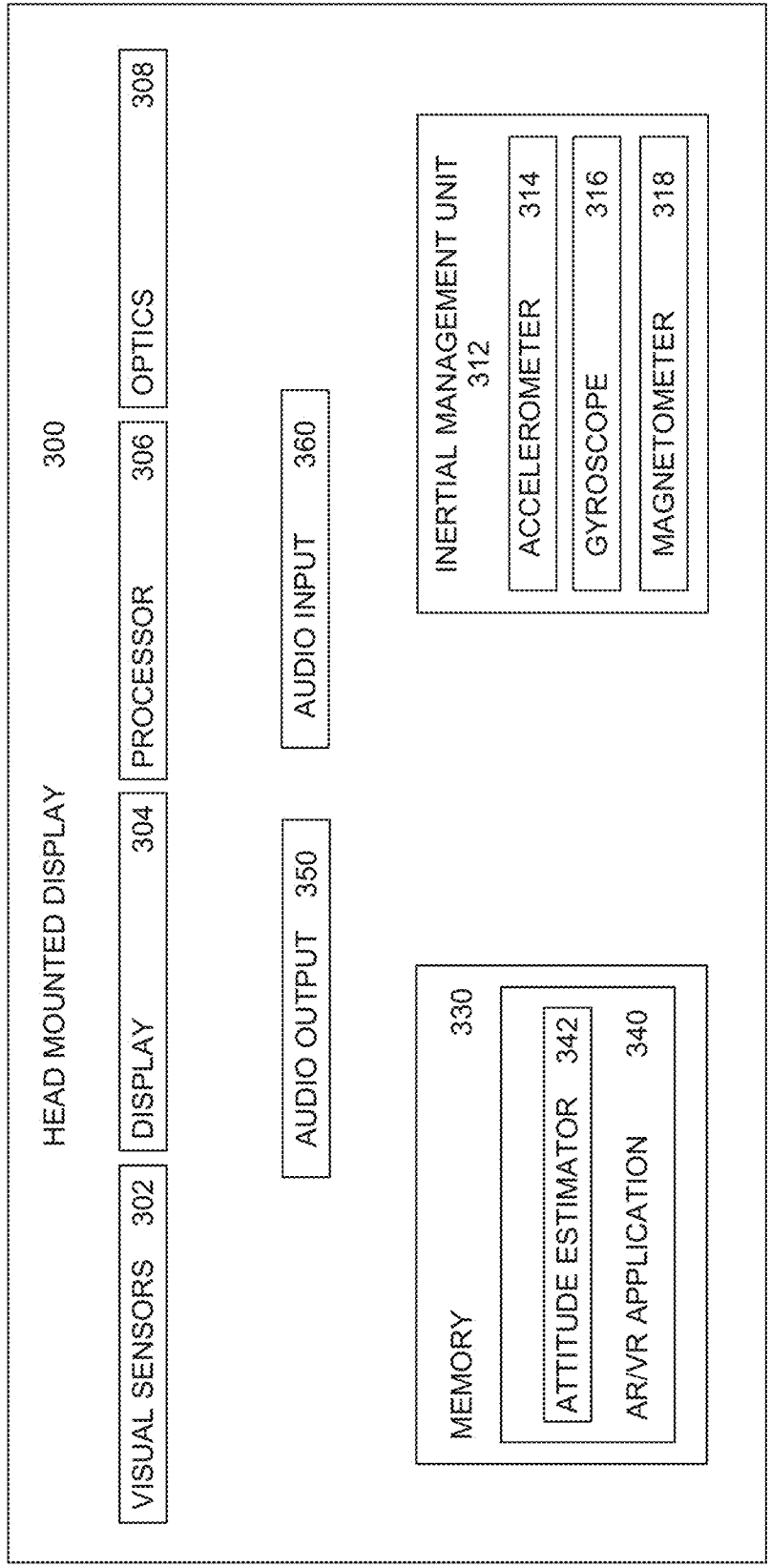
FIG. 3 is an illustration of a head mounted display for use in an exemplary interactive environment, according to an embodiment.

FIG. 3 illustrates an exemplary head mounted display 300, according to one embodiment. The head mounted display 300 can be separate from the user device 200, or the user device 200 and the head mounted display 300 can be integrated together to form a combined device. The head mounted display 300 includes one or more visual sensors 302. The visual sensors 302 can be configured to sense visible light and/or infrared light. Alternatively, the visual sensors 302 can be any other form of suitable visual sensor. The head mounted display 300 further includes a display 304. The display 304 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

The head mounted display 300 includes optics 308. The optics 308 can include mirrors, lenses, beam-splitters, and other suitable components. The optics 308 can be used to facilitate display of the virtual and physical environment to the user. The head mounted display 300 includes audio output 350. The audio output 350 can be speakers, headphones, or any other suitable device to output audio. The head mounted display 300 further includes audio input 360. The audio input 360 can be a microphone, or any other suitable audio input device. In an embodiment, the audio output 350 and audio input 360 are components of the user device 200 (e.g., a microphone and speakers in a mobile telephone or table). In another embodiment, the audio output 350 and audio input 360 are separate components in the head mounted display 300.

In an embodiment, the head mounted display 300 can be a lightweight display that does not include its own processor and memory, but instead relies on the mobile device 200 for operation. For example, the head mounted display 300 can be a slip-in display, in which the processor 206 and the memory 230 of the user device 200 control display and operation of the AR/VR application.

Alternatively, the head mounted display 300 can include its own processor 306 which generally retrieves and executes programming instructions stored in the memory 330. The processor 306 is included to be representative of a single central processing unit (CPU), multiple CPUs, a single CPU having multiple processing cores, graphics processing units (GPUs) having multiple execution paths, and the like. The memory 330 is generally included to be representative of electronic storage of any suitable type(s), including random access memory or non-volatile storage.

The memory 330 generally includes program code for performing various functions related to game play. The program code is generally described as various functional "applications" or "modules" within the memory 330, although alternate implementations may have different functions and/or combinations of functions. Within the memory 330, the AR/VR application 340 is generally configured to control the AR/VR application for the user. The AR/VR application 340 can, for example, be an AR/VR video game, or any other suitable AR/VR application. The AR/VR application 340 in the head mounted display 300 can be generally the same as the AR/VR application 240 in the user device 200. Or the AR/VR application 340 can be different from the AR/VR application 240.

The AR/VR application 340 includes the Attitude Estimator module 342 which estimates the attitude of the peripheral device 400, the head mounted display 300, the user device 200, or any other suitable peripheral device in the system. This estimate is based on measurements from one or more of the IMUs 412 (in the peripheral device 400), 212 (in the user device 200), and 312 (in the head mounted display 300). As illustrated in FIG. 3, the AR/VR application 340 and the attitude estimator module 342 are contained within the memory 330 of the head mounted display 300. Alternatively, the AR/VR application 340 and the attitude estimator module 342 can be contained in memory within the peripheral device 400, the user device 200, or any other suitable location. Further, the attitude estimator module 342 can be contained within the AR/VR application 340, or can be located separately.

The head mounted display 300 includes an IMU 312. As illustrated in FIG. 3, the IMU 312 is separate from the IMU 412 included in the peripheral device 400 and the IMU 212 included in the user device 200. The IMU 312 includes sensors to measure the position and orientation of the head mounted display 300. For example, the IMU 312 can include an accelerometer 314 which measures acceleration forces stemming from movement of the head mounted display 300 in the user's physical environment. The IMU 312 can further include a gyroscope 316 that measures orientation of the head mounted display 300 in the user's physical environment. The IMU 312 can further include the magnetometer 318 which measures properties of a magnetic field in the user's physical environment. The accelerometer 314, gyroscope 316, and magnetometer 318 are merely examples of sensors that can be included within the IMU 312. In an embodiment, the IMU can include additional suitable sensors, or can include fewer sensors. For example, the IMU 312 can include only a magnetometer 318, without an accelerometer or gyroscope.

Figure 4:
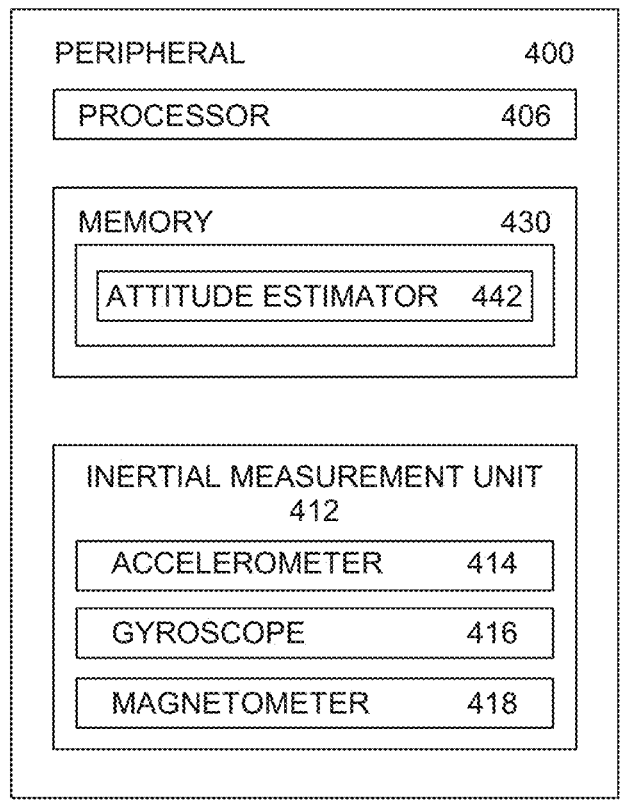
FIG. 4 is an illustration of a peripheral device for use in an exemplary interactive environment, according to an embodiment.

FIG. 4 is an illustration of a peripheral device for use in an exemplary interactive environment, according to an embodiment. In the interactive AR/VR video game example, during gameplay a virtual blade, sword, or staff extending from the peripheral device 400 is projected onto the display of the head mounted display 300. To facilitate this, the peripheral device 400 includes a variety of sensors and buttons. For example, the peripheral device 400 can include physical buttons, touch sensors, or the like for user interaction.

The peripheral device 400 also includes the IMU 412. The IMU 412 includes a nine degree of freedom sensor which may use information received from an accelerometer 414, a gyroscope 416, and a magnetometer 418. The IMU 412 senses the orientation and movement of the peripheral device 400, to facilitate projection of the virtual blade on the head mounted display 300. The accelerometer 414 measures acceleration forces stemming from movement of the peripheral device 400 in the user's physical environment. The gyroscope 416 measures orientation of peripheral device 400 in the user's physical environment. The magnetometer 418 measures properties of a magnetic field in the user's physical environment. The accelerometer 414, gyroscope 416, and magnetometer 418 are merely examples of sensors that can be included within the IMU 412. In an embodiment, the IMU can include additional suitable sensors, or can include fewer sensors.

For example, when the peripheral device 400 is used to simulate a sword or staff, the accelerometer 414 measures acceleration of the peripheral device 400 as the user swings the peripheral device 400. The user device 200 and the head mounted display 300 can use these acceleration measurements from the accelerometer to display acceleration of the virtual blade projected on the head mounted display 300 to the user. In this scenario, the gyroscope 416 measures the orientation of the peripheral device 400 in the user's physical environment. These orientation measurements can be used by the user device 200 and the head mounted display 300 to display the orientation of the virtual blade on the head mounted display 300.

The peripheral device 400 can include its own processor 406 which generally retrieves and executes programming instructions stored in the memory 430. The processor 406 is included to be representative of a single central processing unit (CPU), multiple CPUs, a single CPU having multiple processing cores, graphics processing units (GPUs) having multiple execution paths, and the like. The memory 430 is generally included to be representative of electronic storage of any suitable type(s), including random access memory or non-volatile storage.

The memory 430 generally includes program code for performing various functions related to game play. The program code is generally described as various functional "applications" or "modules" within the memory 430, although alternate implementations may have different functions and/or combinations of functions. Within the memory 430, the attitude estimator module 442 estimates the attitude of the peripheral device 400. This estimate is based on measurements from the IMU 412.

Figure 5:
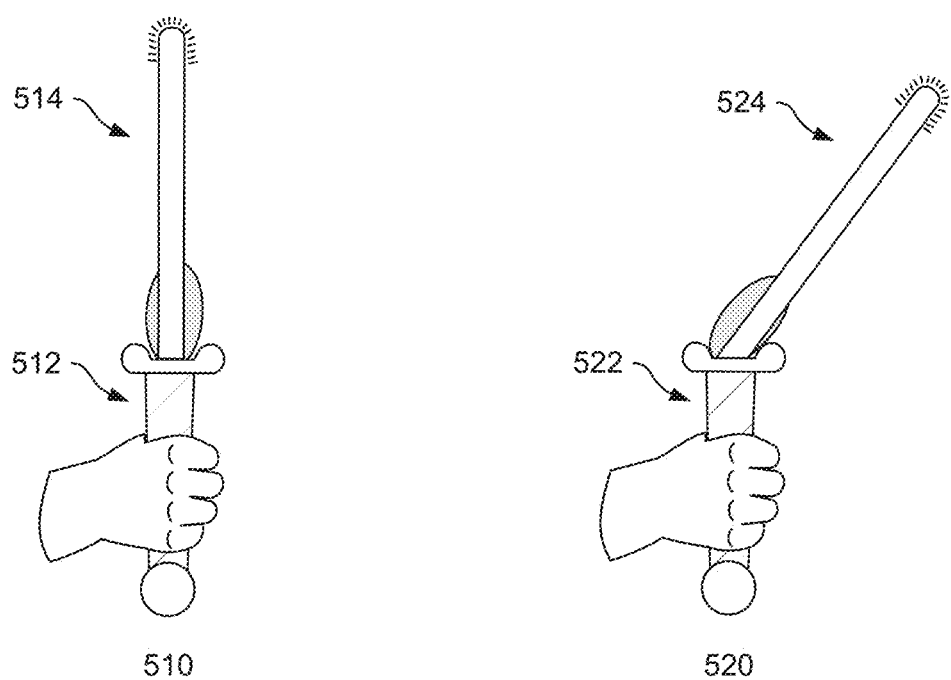
FIG. 5 is an illustration of alignment of a virtual object with a physical object in an AR/VR application, according to an embodiment.

FIG. 5 is an illustration of alignment of a virtual object with a physical object in an AR/VR application, according to an embodiment. As discussed above, in an AR or VR application, it is common to display a virtual object on the same screen as one or more physical objects. As illustrated in FIG. 5, a physical hilt 512 can be combined in user's vision with a virtual blade 514 to form a sword or staff 510. Because the blade 514 is virtual, while the hilt 512 is physical, the AR/VR application (e.g., AR/VR application 240) aligns the virtual blade 514 with the physical hilt 512 so that the blade appears to extend straight out in the sword 510. But, as illustrated in sword 520, if the virtual blade 524 is not properly aligned with the physical hilt 522, the virtual blade 524 can appear askew to the user, ruining the illusion and harming gameplay. As discussed in the following figures, IMUs in the head mounted display, peripheral device (e.g., the peripheral device 400), and user device can be used to gather measurements for aligning the virtual blade with the physical hilt.

Figure 6:
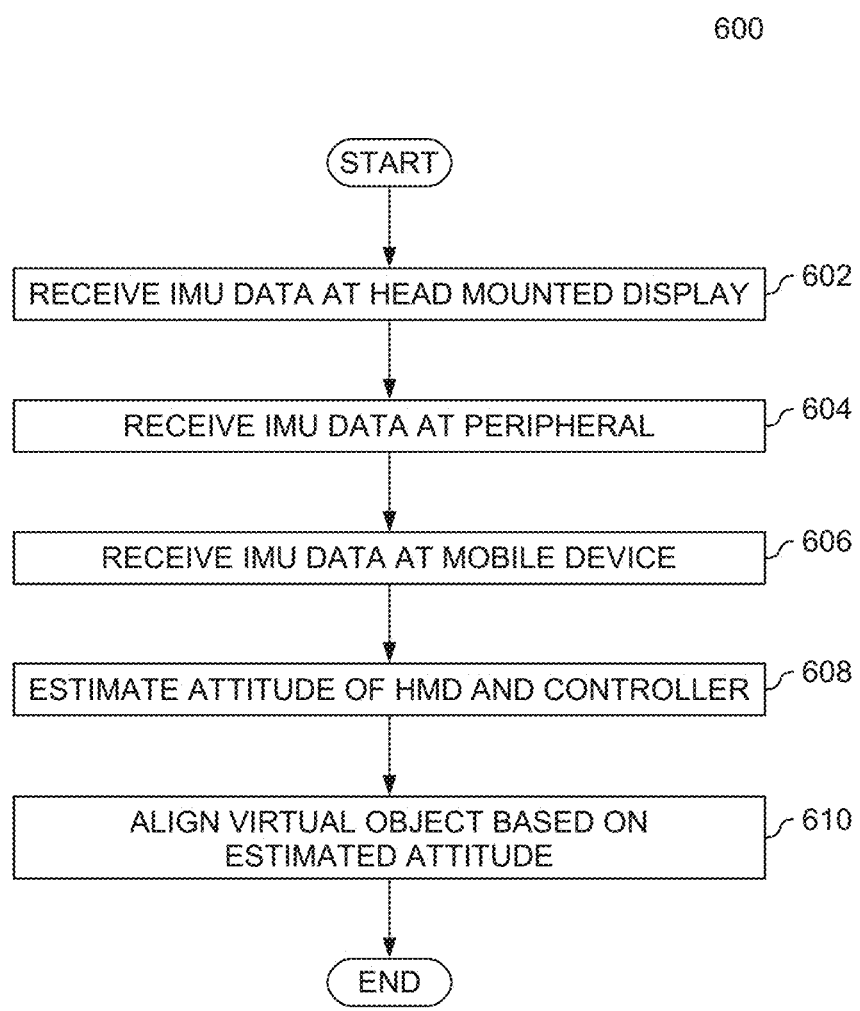
FIG. 6 is a flow chart illustrating alignment of a virtual object in an AR/VR system based on IMU data, according to an embodiment.

FIG. 6 is a flow chart 600 illustrating alignment of a virtual object in an AR/VR system based on IMU data, according to an embodiment. At block 602 the head mounted display 300 receives IMU data from its IMU 312. This includes data from the accelerometer 314, the gyroscope 316, and the magnetometer 318. This data can be used in block 608, discussed below, to determine the direction in which the user is facing and the attitude of the user's head for proper alignment of a virtual object with a physical object in the head mounted display 300.

At block 604 a peripheral device in the AR/VR system (e.g., the peripheral device 400) receives IMU data from its IMU 412. This includes data from the accelerometer 414, the gyroscope 416, and the magnetometer 418. This data can also be used in block 608, discussed below, to determine the attitude of the peripheral device 400 for proper alignment of a virtual object with the peripheral device 400 in the AR/VR display.

At block 606 the mobile device 200 receives IMU data from its IMU 212. This includes data from the accelerometer 214, the gyroscope 216, and the magnetometer 218. This data can further be used in block 608, discussed below, to determine the attitude of the head mounted display for proper alignment of a virtual object with the peripheral device 400 in the AR/VR display. For example, if the head mounted display 300 allows for a slip-in user device 200, the attitude of the user device 200 can be used to determine the direction in which the user is facing and the attitude of the user's head.

At block 608, the attitude estimator module uses IMU data to estimate the attitude of the peripheral device 400 and the head mounted display 300. In an embodiment, the attitude estimator module (e.g., the attitude estimator module 242, 342, or 442) uses nine degree of freedom IMU data (e.g., from the IMU 212, 312, or 412) to estimate the orientation of the device in which the IMU is located, relative to magnetic north and gravity. This can be done by determining yaw, pitch, and roll. The magnetometer in the IMU (e.g., the magnetometer 218, 318, or 418) can be used to determine yaw, and the accelerometer (e.g., the accelerometer 214, 314, or 414) and gyroscope (e.g., the gyroscope 216, 316, or 416) can be used to determine pitch and roll. In an embodiment, the attitude estimator module uses a complementary filter or a fixed gain Kalman filter to filter the magnetometer data and correct for yaw.

In an embodiment, the attitude estimator module 442 in the peripheral device 400 can use data from the IMU 412 to estimate the attitude of the peripheral device 400. The attitude estimator module 342 in the head mounted display 300 can use data from the IMU 312 to estimate the attitude of the head mounted display 300. These estimates can be used in block 610 to align the virtual object with the physical object.

In another embodiment, data from the IMU 312 in the head mounted display 300 can be combined with data from the IMU 212 in the user device 200 to estimate the attitude of the head mounted display 300. As discussed above, in one embodiment the user device 200 can be slipped into the head mounted display. In this embodiment, the IMU 212 in the user device 200 and the IMU 312 in the head mounted display are each measuring the attitude of the head mounted display 300. The data from the IMU 312 in the head mounted display 300 can be used to correct or supplement the data from the IMU 212 in the user device 200.

For example, the IMU 212 in the user device 200 can be built into the user device 200. The data from IMU 212 can be generally accurate, but sometimes inaccurate. For example, because the IMU 212 is built into the user device 200, the AR/VR application 240 does not have full control over the IMU 212. The user device 200 might choose to prioritize other applications over the IMU 212, so that the data received from the IMU 212 is inaccurate or delayed. Thus, the data from the IMU 212 in the user device 200 can be used for a first estimate of the attitude of the head mounted display 300, and the data from the IMU 312 in the head mounted display 300 can be used to verify (and, if necessary, correct) this estimate. Assuming the AR/VR application 240 is running on the user device processor 206, this allows rapid access to an initial estimate from the user device IMU 212 with accurate correction by the head mounted display IMU 312.

In another embodiment data from some of the sensors within the IMU 212 in the user device 200 can be used to estimate the attitude of the head mounted display, along with data from other sensors in the IMU 312 in the head mounted display 300. For example, data from the accelerometer 214 and the gyroscope 216 in the user device 200 can be used, along with data from the magnetometer 318 in the head mounted display. In some circumstances, the magnetometer 218 in the user device 200 may be unreliable and inaccurate, and so it may be preferable to use the magnetometer 318 in the head mounted display.

In another embodiment, as discussed above, the IMU 312 in the head mounted display can be used alone, without the IMU 212 in the user device 200, to estimate the attitude of the head mounted display. For example, the head mounted display 300 might be a stand-alone device, and the AR/VR system may not include a user device 200 at all. In this scenario, the IMU 312 in the head mounted display 300 can be used to estimate the attitude of the head mounted display 300. As another example, the user device 200 could be used a slip-in device with the head mounted display 300, but the attitude of the head mounted display 300 could be estimated based on data from the IMU 312 in the head mounted display 300, alone. In this embodiment, the IMU 312 in the head mounted display 300 can be a dedicated IMU, so that the AR/VR application 240 has full control over the IMU 312. This means the IMU 312 in the head mounted display 300 should provide more accurate measurements than the shared IMU 212 in the user device 200. The attitude of the head mounted display 300 can be estimated from its IMU 312 alone, avoiding the extra calculation of using the IMU 212 in the user device 200 first, and correcting the estimate using the IMU 312 in the head mounted display 300.

At block 610, the AR/VR application (e.g., the AR/VR application 240 in the user device 200 or the AR/VR application 340 in the head mounted display) uses the estimates from the attitude estimators (e.g., the attitude estimator 442 in the peripheral and the attitude estimator 342 in the head mounted display) to align a virtual object (e.g., a virtual blade) with a physical object (e.g., the peripheral device 400) in the user's display (e.g., on the head mounted display 300). For example, the AR/VR application 240 can compare the attitude estimates with fixed vectors. The AR/VR application 240 can estimate a gravity vector, using a gyroscope (e.g., the gyroscope 316 or 416) and an accelerometer (e.g., the accelerometer 314 or 414). The AR/VR application 240 can also estimate a vector for magnetic north, using a magnetometer (e.g., magnetometer 318 or 418) and the attitude estimations. Comparisons with these vectors can be used to align the virtual object with the physical object.

In an embodiment, the AR/VR application 240 aligns the virtual object (e.g., a virtual blade) with the physical object (e.g., the peripheral device 400) by calculating the yaw, pitch, and roll orientation of the physical object relative to the display (e.g., the head mounted display 300). The AR/VR application 240 then measures and calculates the X, Y, Z position of the physical object relative to the display, and uses the resulting combination to align the virtual object with the physical object. In an embodiment, the AR/VR application 240 calculates the yaw, pitch, and roll orientation of the physical object relative to the display using the nine degree of freedom IMU sensors. The AR/VR application 240 uses the IMU in the physical object (e.g., the IMU 412 in the peripheral 400) to measure values relative to magnetic north and gravity, and uses the IMU sensors in the display (e.g., the IMU 312 in the head mounted display 300) to measure values relative to magnetic north and gravity. The AR/VR application 240 can then use attitude estimators and prediction algorithms to determine the physical object and display's respective orientations in real time.

In an embodiment, the AR/VR application 240 calculates the X, Y, Z position of the physical object using visual sensors to capture a light blob. For example, the AR/VR application 240 can use two visual sensors in the display (e.g., visual sensors 302 in the head mounted display 300) to capture a light blob on the peripheral 400. The AR/VR application 240 can then triangulate the position of the peripheral 400. As another example, the AR/VR application 240 could triangulate the position of the peripheral using one visual sensor in the display and two light blogs on the physical device. In an embodiment, the AR/VR application 240 then uses prediction algorithms to determine the physical object's position in real time.

Further, in an embodiment, to align a virtual object with the real-world floor in the display, the AR/VR application 240 measures the yaw, pitch, and roll orientation of the display (e.g., the head mounted display 300). The AR/VR application 240 then calculates the X, Y, Z position of a floor tracking marker (e.g., the beacon 130). The AR/VR application 240 can combine these calculates to display the virtual object on the real world floor.

In an embodiment, alignment of the virtual object with the physical object can occur when the AR/VR application begins, and then reoccur periodically during use of the application. As discussed above, during use of the application the virtual object may appear to drift as compared to the physical object. The AR/VR application (e.g., the AR/VR application 240 in the user device) can initialize the alignment at startup, and then periodically re-align the virtual object. This could be done automatically using, for example, a timer. Further, the peripheral device 400 or head mounted display 300 can include a button or sensor to allow a user to trigger re-alignment. For example, the peripheral device 400 can include a button or touch sensor that the user can press to trigger alignment.

Figure 7:
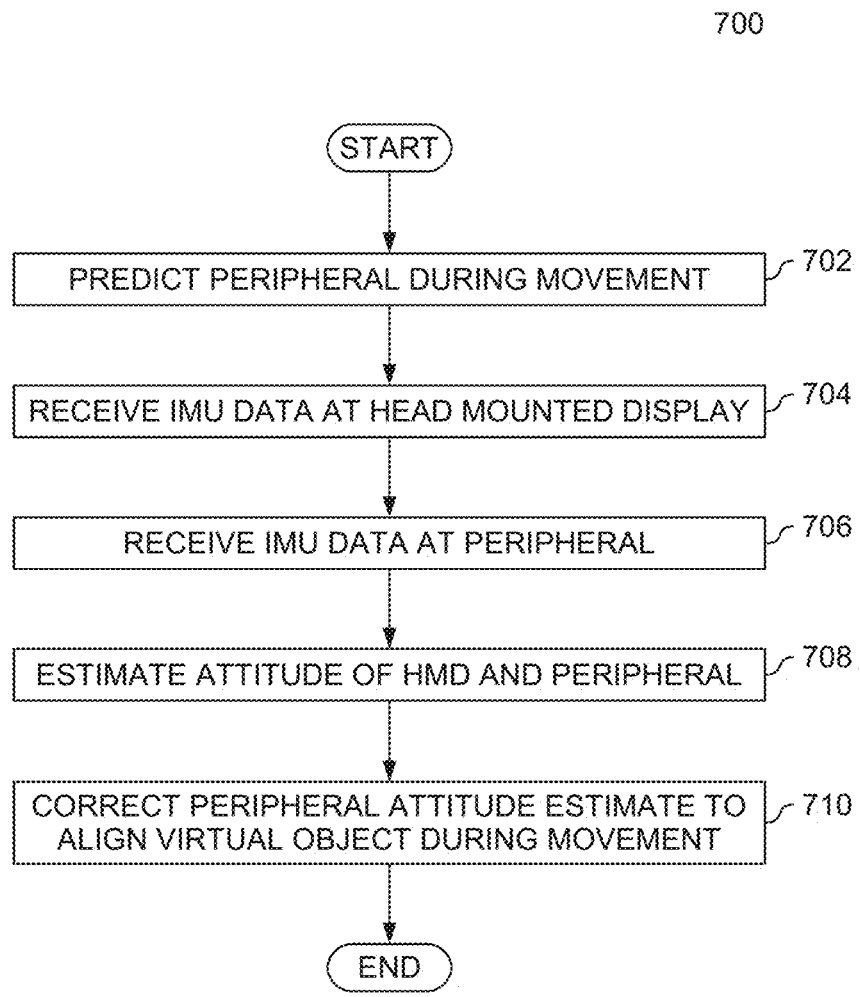
FIG. 7 is a flow chart illustrating correction of a predicted alignment for a virtual object in an AR/VR system, according to an embodiment.

FIG. 7 is a flow chart 700 illustrating correction of a predicted alignment for a virtual object in an AR/VR system, according to an embodiment. At block 702, the attitude estimator module (e.g., the attitude estimator module 442 in the peripheral device 400 or the attitude estimator 242 in the user device 200) predicts the attitude of a peripheral device in the system (e.g., the peripheral device 400). As discussed above, the IMU 412 can be used to estimate the attitude of the peripheral device 400. But when a user moves the peripheral device 400 quickly, for example when mimicking the swing of a sword, the IMU 412 and the attitude estimator module 442 may not be able to act quickly enough to estimate the attitude of the peripheral device 400 throughout the entire arc of the user's movement.

To correct for this, the attitude estimator module 242 can include a prediction function. The attitude of the peripheral device 400 can be estimated at the beginning of the user's movement, and shortly after the movement begins. Because a movement typically continues in the same direction and orientation after it begins, the attitude of the peripheral device 400 as the movement continues can then be estimated before measurements are actually received from the IMU 412. The same can be true for a rapid movement of the head mounted display 300 (e.g., a rapid head movement by the user). The attitude of the head mounted display 300 can be predicted throughout the movement by an attitude estimator module 242 or 342.

Measured IMU data from one or more of the IMUs 412 (in the peripheral device 400), 212 (in the user device 200), and 312 (in the head mounted display 300), can then be used to correct any inaccuracies in the predicted movement of the peripheral device 400 or the head mounted display 300. At block 704 the head mounted display 300 receives IMU data from its IMU 312. This includes data from the accelerometer 314, the gyroscope 316, and the magnetometer 318. This data can be used in block 708, discussed below, to determine the attitude of the head mounted display 300 for correction of a predicted position of a virtual object during a movement by the user.

At block 706 a peripheral device in the AR/VR system (e.g., the peripheral device 400) receives IMU data from its IMU 412. This includes data from the accelerometer 414, the gyroscope 416, and the magnetometer 418. This data can also be used in block 708, discussed below, to determine the attitude of the peripheral device 400 for correction of a predicted position of a virtual object during a movement by the user.

At block 708, the attitude estimator module (e.g., attitude estimator 342 or 442) uses the IMU data from the head mounted display 300 and the peripheral device 400. In an embodiment, data from both IMUs (e.g., IMU 412 and IMU 312) is used to precisely correlate the attitude of two physical devices (e.g., the head mounted display 300 and the peripheral device 400). In another embodiment, data can be collected by an IMU 212 in the user device 200, and data from all three IMUs (e.g., IMU 412 in the peripheral device 400, IMU 212 in the user device, and IMU 312 in the head mounted display 300) can be used to estimate the attitude. This is similar to block 608 discussed with regard to FIG. 6, and will not be repeated here.

At block 710, the attitude estimator module (e.g., the attitude estimator module 242) uses the estimated attitude of the head mounted display 300 and the peripheral 400 to correct the estimate from block 702. As discussed above, during a rapid movement of the peripheral 400 or the head mounted display 300 (or both) the attitude estimator module 242 can predict the attitude of each device during the movement and can align the virtual object (e.g., the virtual blade 514) with the physical object (e.g., the hilt 512) during the movement. At block 710, the estimates from block 708 are used to correct this prediction.

Figure 8:
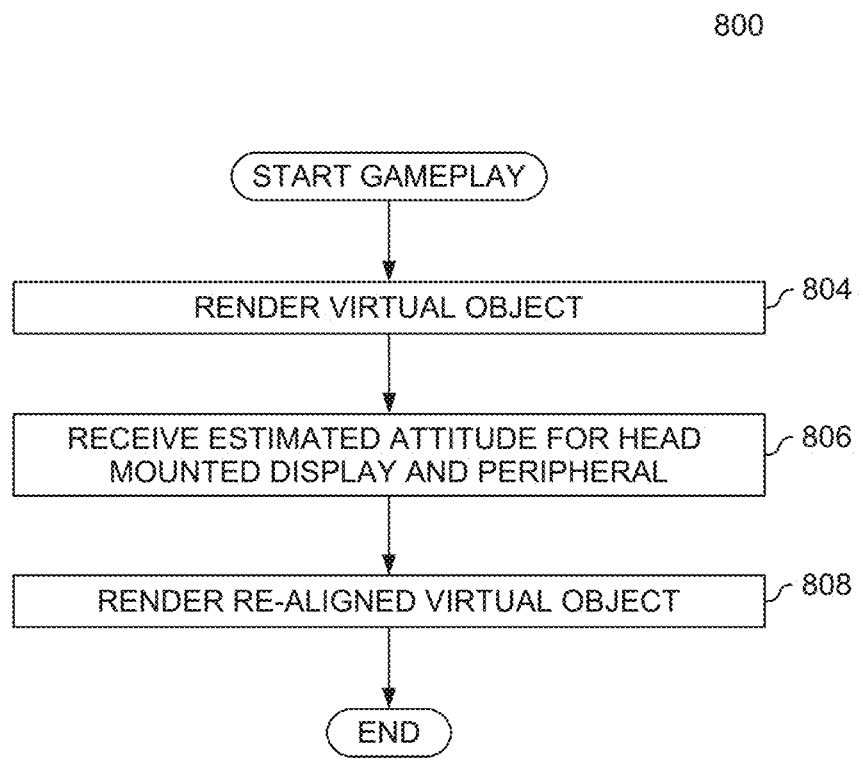
FIG. 8 is a flow chart illustrating rendering and alignment of a virtual object in an AR/VR system, according to an embodiment.

FIG. 8 is a flow chart illustrating rendering and alignment of a virtual object in an AR/VR system, according to an embodiment. At block 804, an AR/VR application (e.g., the AR/VR application 240 in the user device 200) renders a virtual object in a display (e.g., the head mounted display 300) that also depicts a physical object. For example, the AR/VR application 240 can render the virtual blade 514 with the physical hilt 512 so that the virtual blade 514 appears to extend from the hilt 512. But over time, the display of the virtual object can drift, and so the alignment must be corrected.

At block 806, the AR/VR application 240 receives the estimated attitude for the head mounted display 300 and the peripheral (e.g., the peripheral device 400). This can be estimated using the IMUs 412 in the peripheral device 400, 212 in the user device, and 312 in the head mounted display, as discussed above with regard to FIGS. 6 and 7. At block 808, the AR/VR application 240 uses the new estimated attitudes to re-render the virtual object in the display with the physical object. This can correct any drift or other misalignment errors.

While the foregoing is directed to embodiments of the present invention, other and further embodiments of the invention may be devised without departing from the basic scope thereof, and the scope thereof is determined by the claims that follow.

What is claimed is:

1. A system, comprising:
   an electronic peripheral for an Augmented Reality (AR) or Virtual Reality (VR) application, the electronic peripheral comprising a first inertial measurement unit ("IMU"), the first IMU comprising:
      a first magnetometer;
      a first gyroscope; and
      a first accelerometer;
   a head mounted display, comprising a second IMU, the second IMU comprising:
      a second magnetometer;
      a second gyroscope; and
      a second accelerometer;
   a mobile device, comprising a third IMU, the third IMU comprising:
      a third magnetometer
      a third gyroscope; and
      a third accelerometer;
   a processor; and
   a memory storing a program, which, when executed on the processor, performs an operation, the operation comprising:
      receiving a first estimated attitude for the electronic peripheral, the first estimated attitude generated using data from the first IMU;
      determining a second estimated attitude for the head mounted display, comprising:
         determining an initial second estimated attitude for the head mounted display, at the mobile device, using data from the third gyroscope, and the third accelerometer, in the mobile device; and
         after determining the initial second estimated attitude, modifying the determined initial second estimated attitude using data from the second magnetometer in the head mounted display and not from the third magnetometer; and
         predicting a future attitude for the head mounted display, for a future time, based on the modified second estimated attitude for the head mounted display determined using data from the second magnetometer and not from the third magnetometer;
      determining a first orientation of a virtual object for display on the head mounted display based on the estimated first and second attitudes, such that the virtual object is aligned with the electronic peripheral when the virtual object is displayed to a user; and
      displaying the virtual object on the head mounted display using the determined first orientation;
      correcting the predicted future attitude for the head mounted display based on measured data from the second IMU;
      determining a second orientation of the virtual object for display on the head mounted display based on the corrected predicted future attitude for the head mounted display; and
      displaying the virtual object on the head mounted display using the determined second orientation.

2. The system of claim 1, wherein the first estimated attitude for the electronic peripheral is generated by the electronic peripheral.

3. The system of claim 1, wherein the mobile device comprises the processor and the memory storing the program.

4. The system of claim 3, wherein the second estimated attitude is determined by the head mounted display.

5. A computer implemented method of aligning a virtual object with a physical object in an AR or VR application, comprising:
   receiving a first estimated attitude for an electronic peripheral for an AR or VR application, the electronic peripheral comprising a first IMU, the first IMU comprising a first magnetometer, a first gyroscope, and a first accelerometer, wherein the first estimated attitude is generated using data from the first IMU;
   determining a second estimated attitude for a head mounted display, the head mounted display comprising a second IMU, the second IMU comprising a second magnetometer, a second gyroscope, and a second accelerometer, wherein the determining the second estimated attitude comprises:
      determining, at a mobile device, an initial second estimated attitude for the head mounted display using data from a third gyroscope, and a third accelerometer, in the mobile device, wherein the mobile device further comprises a third magnetometer;
      after determining the initial second estimated attitude, modifying the determined initial second estimated attitude using data from the second magnetometer in the head mounted display and not from the third magnetometer; and
      predicting a future attitude for the head mounted display, for a future time, based on the modified second estimated attitude for the head mounted display determined using data from the second magnetometer display and not from the third magnetometer;
   determining a first orientation of a virtual object for display on the head mounted display based on the estimated first and second attitudes, such that the virtual object is aligned with the electronic peripheral when the virtual object is displayed to a user;
   displaying the virtual object on the head mounted display using the determined first orientation;
   correcting the predicted future attitude for the head mounted display based on measured data from the second IMU;
   determining a second orientation of the virtual object for display on the head mounted display based on the corrected predicted future attitude for the head mounted display; and
   displaying the virtual object on the head mounted display using the determined second orientation.

6. The method of claim 5, wherein the first estimated attitude for the electronic peripheral is generated by the electronic peripheral.

7. The method of claim 6, wherein determining the first orientation of the virtual object further comprises comparing the first estimated attitude for the electronic peripheral and the second estimated attitude for the head mounted display with a plurality of fixed vectors, comprising a first vector relating to gravity and a second vector relating to magnetic north.

8. The method of claim 5, wherein the second estimated attitude is determined by the head mounted display.

9. A computer program product for aligning a virtual object with a physical object in an AR or VR application, the computer program product comprising:

a non-transitory computer-readable storage medium having computer-readable program code embodied therewith, wherein the code, when executed by a processor, performs an operation, the operation comprising:

receiving a first estimated attitude for an electronic peripheral for an AR or VR application, the electronic peripheral comprising a first IMU, the first IMU comprising a first magnetometer, a first gyroscope, and a first accelerometer, wherein the first estimated attitude is generated using data from the first IMU;

determining a second estimated attitude for a head mounted display, the head mounted display comprising a second IMU, the second IMU comprising a second magnetometer, a second gyroscope, and a second accelerometer, wherein the determining the second estimated attitude comprises:

determining, at a mobile device, an initial second estimated attitude for the head mounted display using data from a third gyroscope, and a third accelerometer, in the mobile device, wherein the mobile device further comprises a third magnetometer;

after determining the initial second estimated attitude, modifying the determined initial second estimated attitude using data from the second magnetometer in the head mounted display and not from the third magnetometer; and predicting a future attitude for the head mounted display, for a future time, based on the modified second estimated attitude for the head mounted display determined using data from the second magnetometer and not from the third magnetometer;

determining a first orientation of a virtual object for display on the head mounted display based on the estimated first and second attitudes, such that the virtual object is aligned with the electronic peripheral when the virtual object is displayed to a user;

displaying the virtual object on the head mounted display using the determined first orientation;

correcting the predicted future attitude for the head mounted display based on measured data from the second IMU;

determining a second orientation of the virtual object for display on the head mounted display based on the corrected predicted future attitude for the head mounted display; and displaying the virtual object on the head mounted display using the determined second orientation.

10. The computer program product of claim 9, wherein the first estimated attitude for the electronic peripheral is generated by the electronic peripheral.

11. The computer program product of claim 9, wherein determining the first orientation of the virtual object further comprises comparing the first estimated attitude for the electronic peripheral and the second estimated attitude for the head mounted display with a plurality of fixed vectors, comprising a first vector relating to gravity and a second vector relating to magnetic north.

12. The computer program product of claim 9, wherein the second estimated attitude is determined by the head mounted display.

13. The system of claim 1, wherein the predicting the future attitude for the head mounted display is further based on a third estimated attitude for the head mounted display determined at a different time than the second estimated attitude for the head mounted display.

14. The method of claim 5, wherein the predicting the future attitude for the head mounted display is further based on a third estimated attitude for the head mounted display determined at a different time than the second estimated attitude for the head mounted display.

15. The system of claim 1, wherein determining the first orientation of the virtual object further comprises comparing the first estimated attitude for the electronic peripheral and the second estimated attitude for the head mounted display with a plurality of fixed vectors, comprising a first vector relating to gravity and a second vector relating to magnetic north.

* * * * *

UNITED STATES PATENT AND TRADEMARK OFFICE
CERTIFICATE OF CORRECTION

PATENT NO. : 11,100,713 B2
APPLICATION NO. : 16/104452
DATED : August 24, 2021
INVENTOR(S) : Nathan D. Nocon et al.

Page 1 of 1

It is certified that error appears in the above-identified patent and that said Letters Patent is hereby corrected as shown below:

In the Claims

In Column 18, Line 36, in Claim 5, before "and not" delete "display".

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*